Figure 1:
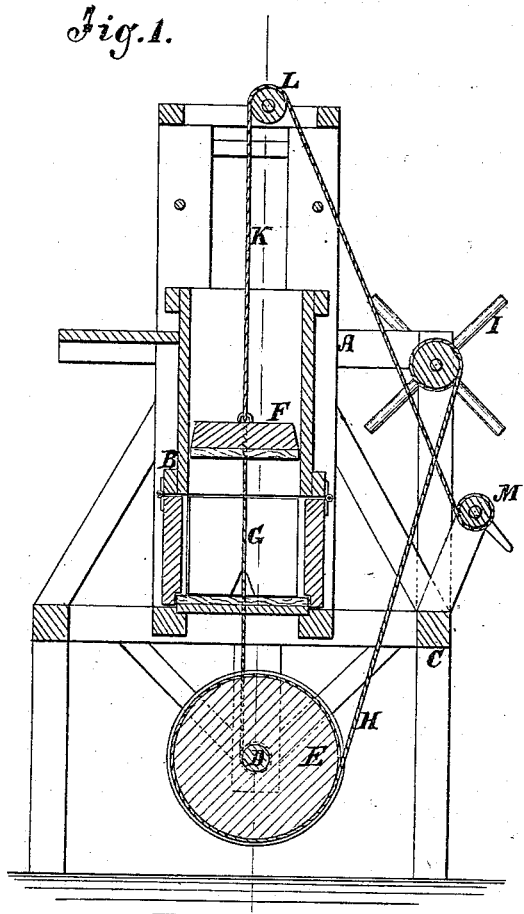
Figure 2:
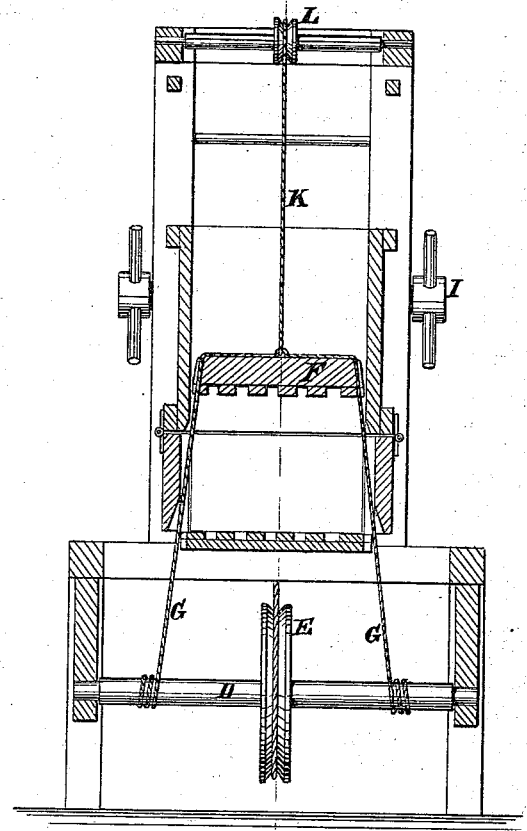

A. W. MASON.
Improvement in Baling-Presses.

No. 125,971.  Patented April 23, 1872.

Witnesses:
A Bennerkendorf.
Geo. W. Mabee

Inventor:
A. W. Mason
Per
Attorneys.

UNITED STATES PATENT OFFICE.

ADAM W. MASON, OF STATION 2, (P. & G. R. R.,) FLORIDA.

IMPROVEMENT IN BALING-PRESSES.

Specification forming part of Letters Patent No. 125,971, dated April 23, 1872.

Specification describing a new and Improved Press, invented by ADAM WHITFIELD MASON, of Station 2, (P. & G. R. R.,) in the county of Jefferson and State of Florida.

My invention consists of a strong rope extending from each end of the follower down through the bottom or outside of the press to a roller, to be wound thereon for forcing the follower down; and in connection with said roller is a drum-cord and another roller for working the follower by hand or by horse, as preferred, the latter being arranged in front of the press in a suitable position for so working it, and all being so arranged as to afford sufficient leverage for the purpose. The roller and drum below the press will be arranged in a pit, or above ground when the press is to stand on the ground; but it may be placed above. For raising the follower there is a single rope extending upward over a guide-pulley and down to a small hand roller, also arranged on the frame in front of it, or in any position for convenience.

The drawing represents two sectional elevations of my improved press.

A is the press-frame, and B the case, which are of any ordinary construction; they will either be placed on an elevated foundation, C, or over a pit, for providing space below the case for the roller D and the grooved drum E, used for forcing the follower F down to press the bale by the ropes G, one attached to each end of said follower, and both extending down to the roller through the bottom or outside of the case, and winding thereon, as shown, and the drum E being worked by the cord H and drum or windlass I, said drum and windlass being proportioned to facilitate the operation of the press by hand or horse power, and the roller I being arranged in front of the case, a suitable height or distance from the bottom, for convenience in operating it. K is a rope for raising the follower; it is attached to the top, passes up over the guide-pulley L, and down to the roller M, which is turned in the same manner that I is, and thus raises the follower when the ropes G are unwound from roller D.

Having thus described my invention, I claim as new, and desire to secure by Letters Patent—

1. The combination of windlass D E and ropes G and H with the follower F, the windlass being arranged under the press, and the ropes G passing down inside and through the bottom of the said case, all substantially as specified.

2. The combination of the drum E, rope H, and roller I with roller D, the latter being under the press, and the roller I being arranged in front of the press-case, all constructed substantially as specified.

3. In combination with the follower and the above-described apparatus for working it, the lifting rope K and the roller M, all substantially as specified.

A. W. MASON.

Witnesses:
C. G. EDWARDS,
G. E. DENNIS.